United States Patent [19]

Minamishima

[11] Patent Number: 4,549,255
[45] Date of Patent: Oct. 22, 1985

[54] DC-TO-DC CONVERSION CIRCUIT WITH SHARED REGULATION OF OUTPUTS

[75] Inventor: Mamoru Minamishima, Kodaira, Japan

[73] Assignee: Nakamichi Corporation, Tokyo, Japan

[21] Appl. No.: 554,150

[22] Filed: Nov. 21, 1983

[30] Foreign Application Priority Data

Dec. 2, 1982 [JP] Japan ................................ 57-211660

[51] Int. Cl.$^4$ ............................................ H02M 3/335
[52] U.S. Cl. ..................................... 363/26; 323/267; 363/97; 363/134
[58] Field of Search ........................ 323/281, 316, 267; 363/26, 97, 133, 134

[56] References Cited

U.S. PATENT DOCUMENTS

| | | | |
|---|---|---|---|
| 3,743,924 | 7/1973 | Genuit et al. | 323/267 |
| 3,790,878 | 2/1974 | Brokaw | 323/267 |
| 4,196,320 | 4/1980 | Townsend | 363/26 |
| 4,368,420 | 1/1983 | Kuo | 323/281 |
| 4,399,399 | 8/1983 | Joseph | 323/316 |

FOREIGN PATENT DOCUMENTS 993404  1/1983  U.S.S.R. ............................. 363/26

Primary Examiner—Peter S. Wong
Assistant Examiner—D. L. Rebsch
Attorney, Agent, or Firm—Jordan and Hamburg

[57] ABSTRACT

A DC-to-DC conversion circuit for supplying dual positive and negative DC output voltages of the same level in absolute value to a load circuit such as a class B power amplifier. An alternative fluctuation in the positive and negative DC output voltages is regulated, making it unnecessary to regulate both simultaneously.

2 Claims, 3 Drawing Figures

DC-TO-DC CONVERSION CIRCUIT WITH SHARED REGULATION OF OUTPUTS

The present invention relates to a dc-to-dc conversion circuit for supplying dual positive and negative DC output voltages of the same level in absolute value to a load circuit wherein fluctuations in the positive and negative DC output voltages occur alternatively.

The following two types of dc-to-dc conversion circuits may be listed as prior art, although related printed material can not be found.

(a) A first type conversion circuit having only a circuitry arrangement for generating positive and negative DC output voltages of the same level in absolute value, and having no additional circuitry arrangement for compensating the variation of the dc output voltages due to load fluctuation.

(b) A second type conversion circuit having a first circuitry arrangement the same as that in the first type and a second circuitry arrangement for detecting any change in one of both positive and negative DC output voltages and generating a control signal to cancel this change due to fluctuation in a load.

If a class B power amplifier is employed as the load of such dc-to-dc conversion circuit, positive and negative load fluctuations occur alternatively. In the first type conventional arrangement, a load fluctuation appears directly as an output voltage variation to cause a clipping distortion. In the second type conventional arrangement, the detected and controlled positive or negative dc output voltage can be regulated but non-controlled negative or positive voltage vary about the predetermined value, due to load fluctuation to cause also a clipping distortion. The latter arrangement may be modified to detect both the positive and negative dc output voltages, but it requires double regulation systems to make a circuitry arrangement therefor complicated.

An object of the invention is to provide a dc-to-dc conversion circuit with a simple circuitry arrangement which does not cause any clipping distortion or effectively suppresses the same.

According to the invention, the object can be attained by a transformer means having primary and secondary windings, control means to control the flow period of the primary current through the primary winding of the transformer means in response to a control signal, a rectifier-filter means connected to the secondary winding of the transformer means for generating the positive and negative DC output voltages, and comparing and generating means for comparing two levels of the positive and negative DC output voltages in absolute value and generating the control signal in response to a lower level of the two levels, whereby the DC output voltage causing the fluctuation is regulated.

The invention will now be further explained with reference to the accompanying drawings.

DESCRIPTION OF THE PREFERRED EMBODIMENTS

Figure 1:
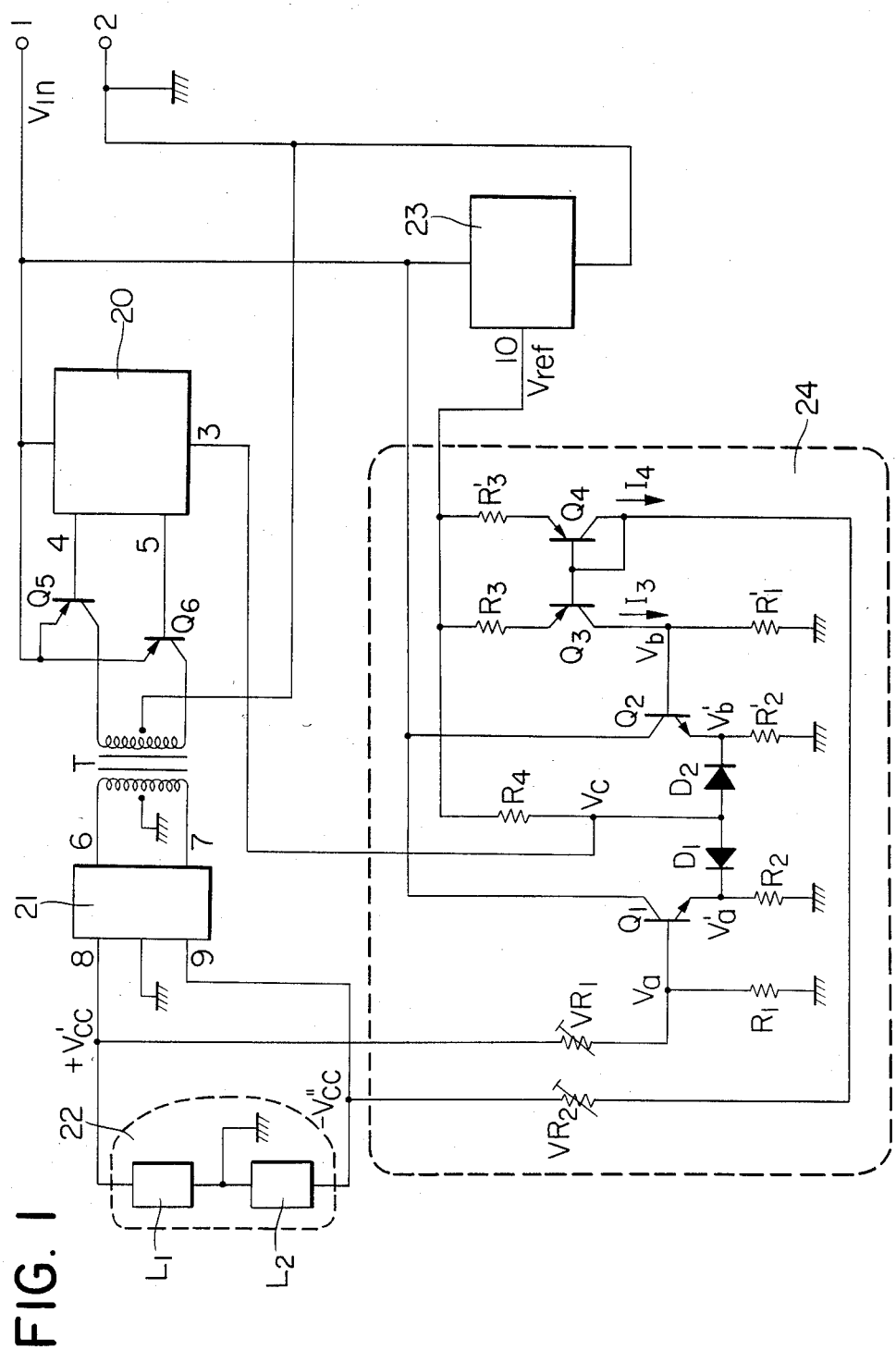
FIG. 1 is a circuit diagram showing an embodiment of the invention.

In FIG. 1, a primary dc voltage $V_{in}$ is applied between input terminals 1 and 2 at a primary winding of a converting transformer T. Reference numeral 20 shows a regulating pulse width modulator having an input terminal 3 and output terminals 4, 5 to generate push-pull constant frequency pulse signals, a pulse width thereof being controlled by a DC voltage to be applied to the iput terminal 3 from an absolute value detecting circuit 24 to be explained later. Transistors $Q_5$, $Q_6$ are switching transistors for driving a primary current of the transformer T, each of them having a base connected respectively to the output terminals 4, 5 of the regulating pulse width modulator circuit 20 so that each transistor is controlled by the constant frequency pulse signal to be fed through the output terminals 4, 5. Reference numeral 21 shows a rectifier-filter circuit having input terminals 6, 7 connected to a secondary winding of the transformer T, and having a first output terminal 8 for generating a dc output voltage $+V'_{cc}$ which is positive to a reference ground potential and a second output terminal 9 for generating a dc output voltage $-V''_{cc}$ which is negative to the reference potential. Reference numeral 22 shows a load circuit connected between the output terminals 8, 9 of the rectifier-filter circuit 21. In the illustrated embodiment, for instance, an output stage of a class B power amplifier is connected as loads $L_1$, $L_2$ in the load circuit 22. Reference numeral 23 shows a constant voltage generating circuit which is connected to the primary input terminals 1, 2 to generate a constant voltage $V_{const}$ at its output terminal 10. The absolute value detecting circuit 24 is provided with a transistor $Q_1$ having a base connected to the output terminal 8 of the rectifier-filter circuit 21 through a variable resistor $VR_1$ and grounded through a resistor $R_1$, an emitter grounded through a resistor $R_2$ and connected to a cathode of a diode $D_1$, and a collector connected to the primary input terminal 1. There is also arranged another transistor $Q_2$ having a base grounded through a resistor $R'_1$ and connected to a collector of a transistor $Q_3$ which has an emitter connected to the output terminal 10 of the constant voltage generating circuit 23 through a resistor $R_3$ and has a base connected directly to the base and collector of a transistor $Q_4$. An emitter of the transistor $Q_4$ is connected to the output terminal 10 of the constant voltage generating circuit 23 through a resistor $R'_3$ and the collector thereof is connected to the output terminal 9 of the rectifier-filter circuit 21 through a variable resistor register $VR_2$. A collector of the transistor $Q_2$ is connected to the primary input terminal 1, and the emitter is grounded through a resistor $R'_2$ and connected to a cathode of the diode $D_2$, the anode of which is connected to the anode of the diode $D_1$ and connected also to the output terminal 10 of the constant voltage generating circuit 23 through a resistor $R_4$. A cross-point between the diodes $D_1$ and $D_2$ is connected to the input terminal 3 of the regulating pulse width modulator 20.

According to such a circuitry arrangement, the base voltage $V_a$ of the transistor $Q_1$ can be determined by the following equation, if the base current of the transistor $Q_1$ is ignored.

$$V_a = +V_{cc} \times \frac{R_1}{R_1 + VR_1}$$

The base voltage $V_b$ of the transistor $Q_2$ can be determined depending on the current $I_3$ flowing through the resistor $R'_1$ (In this case, of course, the base current of the transistor $Q_2$ is ignored). If the respective resistance value of the resistors $R_3$ and $R'_3$ connected respectively to each emitter of the transistors $Q_3$ and $Q_4$ is set at the same value, the collector current $I_3$ of transistor $Q_3$ will have the same value as the collector current $I_4$ of transistor $Q_4$, since the base voltages of transistors $Q_3$, $Q_4$ are common with each other (In this case, the base currents of the transistors $Q_3$, $Q_4$ are ignored). The value of current $I_4$ can be determined by the following equation.

$$I_4 = \frac{V_{const} + |-V''_{cc}| - V_{be}}{R_3 + VR_2}$$

wherein $V_{be}$ is the base-to-emitter voltage of the transistor $Q_4$.

Therefore, the base voltage $V_b$ of transistor $Q_2$ can now be determined by the following equation.

$$V_b = I_4 \times R'_1$$
$$= [|-V''_{cc}| + V_{const} - V_{be}] \times \frac{R'_1}{R_3 + VR_2}$$

On the other hand, the voltage $V_c$ appearing at the cross-point between the anodes of the diodes $D_1$ and $D_2$ will be the the sum of the lower voltage of both emitter voltages $V'_a$ and $V'_b$ of the transistors $Q_1$, $Q_2$ and the forward voltage drop of the corresponding diode. The forward voltage drop of the diode is substantially the same as a value of the base to emitter voltage of the transistor. Therefore, the voltage $V_c$ will become equal to the lower voltage of the base voltages $V_a$ and of $V_b$ in the transistors $Q_1$ and $Q_2$.

In such an arrangement, in the first place, the pulse width of the constant frequency pulse signals generated from the regulating pulse width modulator control circuit 20 is so predetermined that the positive and negative DC output voltages $+V'_{cc}$, $-V''_{cc}$ will become the same desired level in absolute value, when there is no load. The setting of the pulse width is carried out by adjusting the variable resistors $VR_1$ and $VR_2$ and predetermining the base voltages $V_a$ and $V_b$ of the transistors $Q_1$ and $Q_2$ in the non-load mode. Since, as shown in the illustrated embodiment, the output stages of the class B power amplifier are loaded and connected as $L_1$, $L_2$, the positive and negative DC voltages $+V'_{cc}$, $-V''_{cc}$ tend to alternatively fluctuate and drop down to a level lower than the above predetermined level $V_{cc}$, in response to the behavior of the loads.

In this operating mode, the base voltages $V_a$, $V_b$ of the transistors $Q_1$, $Q_2$ also alternatively fluctuate and drop down to levels lower than the above predetermined one in response to the fluctuations of the dc output voltages $+V'_{cc}$, $-V''_{cc}$. Therefore, the voltage applied to the input terminal 3 of the modulator circuit 20 changes correspondingly and the pulse width of the push-pull constant frequency signal changes correspondingly to the change in the output voltages $+V'_{cc}$ and $-V''_{cc}$ for controlling the switching transistors $Q_5$, $Q_6$ and cancelling this change. Thus the positive and negative dc output voltages $+V'_{cc}$ and $-V''_{cc}$ can be so alternatively controlled that the fluctuated DC output voltage always coincides with the predetermined voltage $V_{cc}$.

Figure 2:
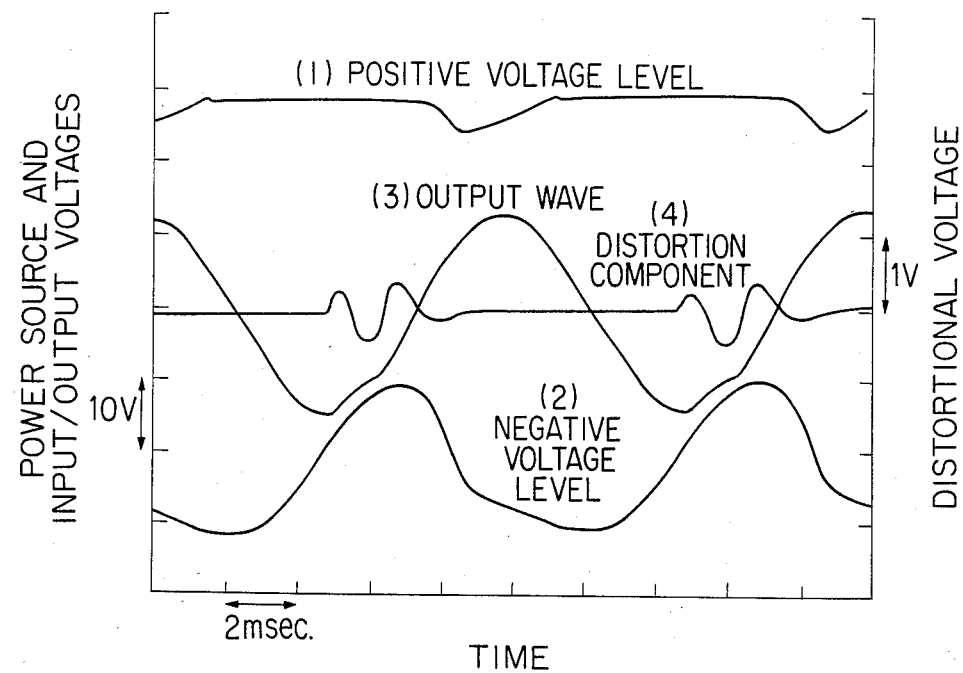
FIG. 2 is a synchroscopic graph showing an output wave and a distortion in case where the dc positive output voltage only is controled.
Figure 3:
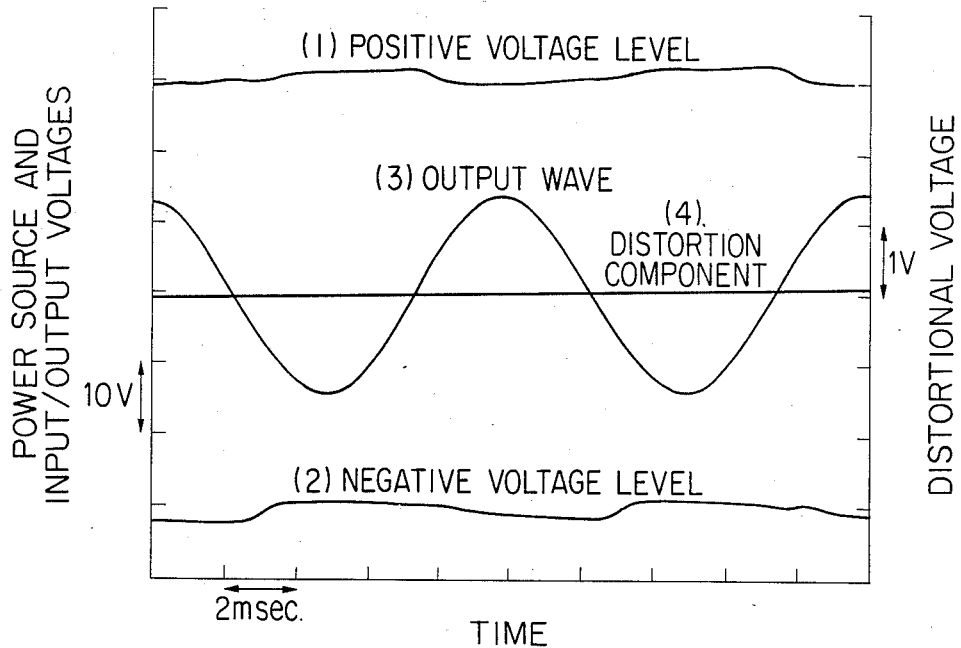
FIG. 3 is a graph similar to that in FIG. 2 but where both positive and negative dc output voltages are controlled, in accordance with the invention.

FIGS. 2 and 3 are synchroscopic graphs showing output waves and distortions, wherein only a positive output voltage is controlled by opening the diode $D_2$ in FIG. 1 as well as both positive and negative output voltages are controlled as in FIG. 1, as obtained with use of the following instruments.

Load

Class B Power Amplifier, Type PA-300 manufactured by Nakamichi Corp.

Power Source

DC Power Supply, Type PAD 16-50L manufactured by Kikusui Electronics Corp.

Distortion Measuring Instrument

Distortion Measuring System, Type 1700 B manufactured by Sound Technology

Synchroscope

Type SS-5711 manufactured by Iwatsu Electric Co., Ltd.

Load Resistor

4Ω

The output wave in FIG. 2 has distortions in its configuration due to a level fluctuation in the negative voltage, based on a load fluctuation but the output wave in FIG. 3 maintains a substantially complete form. Further, in case of FIG. 2, a distortion was measured as 1% but in FIG. 3 as 0.0017%.

I claim:

1. A DC-to-DC conversion circuit for supplying dual positive and negative DC output voltages of the same level in absolute value to a load circuit wherein fluctuations in said positive and negative DC ouput voltages occur alternatively, comprising:

transformer means having primary and secondary windings;

control means to control the flow period of primary current through said primary winding of said transformer means in response to a control signal;

a rectifier-filter means connected to said secondary winding of said transformer means for generating said positive and negative DC output voltages; and comparing and generating means for comparing two levels of said positive and negative DC output voltages in absolute value and generating said control signal in response to a lower level of said two levels, whereby said DC output voltage causing said fluctuation is regulated.

2. A DC-to-DC conversion circuit as claimed in claim 1, wherein said comparing and generating means comprises:

first transistor means for detecting the positive DC output voltage level;

second transistor means for converting the negative DC output voltage into a corresponding positive voltage;

third transistor means for detecting the level of said converted positive voltage; and diode means to compare the two levels detected by said first and third transistor means and provide an anode voltage as said control signal in response to the lower level of said two levels.

* * * * *